United States Patent [19]
Walter et al.

[11] Patent Number: 5,118,718
[45] Date of Patent: Jun. 2, 1992

[54] EXPANDABLE STYRENE POLYMERS OF HIGH EXPANDABILITY

[75] Inventors: Manfred Walter, Speyer; Wolfram Husemann, Neustadt; Dieter Naegele, Worms, all of Fed. Rep. of Germany

[73] Assignee: BASF Aktiengesellschaft, Fed. Rep. of Germany

[21] Appl. No.: 795,152

[22] Filed: Nov. 20, 1991

[30] Foreign Application Priority Data

Nov. 29, 1990 [DE] Fed. Rep. of Germany ....... 4038044

[51] Int. Cl.$^5$ ................................................ C08J 9/20
[52] U.S. Cl. ........................................ 521/56; 521/59; 521/60; 521/146
[58] Field of Search .................... 521/56, 60, 146

[56] References Cited

U.S. PATENT DOCUMENTS

| | | | |
|---|---|---|---|
| 4,113,668 | 9/1978 | Foward et al. .................. | 521/146 |
| 4,133,858 | 1/1979 | Hayakawa et al. ............... | 521/146 |
| 4,198,486 | 4/1980 | Mylich et al. .................. | 521/94 |
| 4,430,450 | 2/1984 | Senda .......................... | 521/60 |
| 4,459,373 | 7/1984 | Holm et al. .................... | 521/60 |
| 4,513,105 | 4/1985 | Holm et al. .................... | 521/60 |
| 4,520,135 | 5/1985 | Holm et al. .................... | 521/60 |
| 4,525,484 | 6/1985 | Holm et al. .................... | 521/60 |
| 4,980,381 | 12/1990 | Hintz et al. ................... | 521/60 |

*Primary Examiner*—Morton Foelak
*Attorney, Agent, or Firm*—Keil & Weinkauf

[57] ABSTRACT

Expandable styrene polymers of high expandability comprise
a) a styrene polymer having a viscosity, measured in toluene, of from 55 to 80 [ml/g] and a melt flow index MFI (190° C., 3.8 kp) of from 7.5 to 30 [g/10 min],
b) from 1 to 10% by weight, based on a), of a $C_3$- to $C_6$-hydrocarbon as blowing agent, and, if desired,
c) conventional assistants in effective amounts.

2 Claims, No Drawings

EXPANDABLE STYRENE POLYMERS OF HIGH EXPANDABILITY

The present invention relates to expandable styrene polymers which are distinguished by a particularly high expansion capacity.

EP-B 106 129 discloses an expandable polystyrene of improved expandability in which the polystyrene has a mean molecular weight $M_w$ (weight average) of from 130 000 to 180 000 and in which the high-molecular-weight edge of the molecular weight distribution curve is so steep that the difference between the means $(M_{z+1}-M_z)$ is less than 150 000. According to the examples in this patent, expandable polystyrene of this type, which contains about 1 mol of pentane per kg of polystyrene, can be expanded in high throughput to give foam beads having a bulk density of 15 g/l.

It is an object of the present invention to develop expandable polystyrene which has a significantly greater expansion capacity, i.e. which can be expanded using comparable amounts of blowing agent to give a significantly lower bulk density, or allows comparable bulk densities to be produced using significantly lower amounts of blowing agent.

We have found that, surprisingly, this object is achieved by means of a styrene polymer having a viscosity, measured in toluene, of from 55 to 80 [ml/g] and a melt flow index MFI (190° C., 3.8 kp) of from 7.5 to 30 [g/10 min].

The present invention accordingly provides expandable styrene polymers of high expandability, comprising
a) a styrene polymer having a viscosity, measured in toluene, of from 55 to 80 [ml/g] and a melt flow index MFI (190° C., 3.8 kp) of from 7.5 to 30 [g/10 min],
b) from 1 to 10% by weight, based on a), of a $C_3$- to $C_6$-hydrocarbon as blowing agent, and, if desired,
c) conventional assistants in effective amounts.

The present invention furthermore provides a process for the preparation of expandable styrene polymers, which comprises polymerizing styrene and, if desired, further comonomers containing a polymerizable double bond in aqueous suspension in the presence of from 0.01 to 1% by weight of a regulator having a chaintransfer constant K of from 0.1 to 50 and in the presence of from 0.0025 to 0.05% by weight of a monomer containing more than one polymerizable double bond as branching agent, and adding the blowing agent and, if used, conventional additives before, during or after the polymerization.

The present invention furthermore provides styrene polymer foams having a density of from 0.005 to 0.1 g/cm$^3$ and comprising
a) a styrene polymer having a viscosity, measured in toluene, of from 55 to 80 [ml/g] and a melt flow index MFI (190° C., 3.8 kp) of from 7.5 to 30 [g/10 min], and, if desired,
c) conventional additives in effective amounts.

Surprisingly, the dimensional stability of the foam moldings produced from the novel expandable styrene polymers is not adversely affected.

The principal component a) in the novel products is polystyrene and/or a styrene polymer containing at least 50% by weight, preferably at least 80% by weight, of copolymerized styrene. Examples of suitable comonomers are α-methylstyrene, ring-halogenated styrenes, ringalkylated styrenes, acrylonitrile, esters of acrylic or methacrylic acid with alcohols having from 1 to 8 carbon atoms, N-vinylcarbazole, maleic acid and maleic anhydride. The styrene polymer advantageously contains a small amount of a copolymerized branching agent, i.e. a compound containing more than one, preferably 2, double bonds. The branching agent is generally used in amounts of from 0.0025 to 0.05 mol-%, based on styrene.

It is also possible to use mixtures of different styrene polymers, as described, for example, in DE-A 39 01 329, 39 08 238, 39 36 596, 39 31 862 and 39 16 602.

The styrene polymers according to the invention differ from those of the prior art through having considerably higher melt flow indexes at comparable viscosities. The viscosity, measured in accordance with DIN 53 726 (in toluene, 0.5% at 25° C.), is from 55 to 80 [ml/g], preferably from 60 to 75 [ml/g]. The melt flow index MFI (190° C., 3.8 kp), measured in accordance with DIN 53 735, is from 7.5 to 30 [g/10 min], preferably from 10 to 20 [g/10 min]. The greatly increased melt flow index compared with conventional styrene polymers having the same viscosity is due to the fact that the styrene polymer according to the invention is branched.

Determination of the degree of branching by the method indicated in the examples shows that from about 0.6 to 1.6 branching points have been incorporated into the polymer chain per molecule of the branching agent containing two polymerizable double bonds, and that the polymer contains from about 0.05 to 2.0, preferably from 0.1 to 1.0, branching points per 1000 monomer units.

The choice of branching agent used should expediently be such that the styrene polymer contains virtually no crosslinking, or none at all, i.e. it should be one hundred percent or at least 98% soluble in boiling toluene.

The mean molecular weight (weight average) of the styrene polymers is generally from 150 000 to 300 000, preferably from 180 000 to 260 000. The proportion having a molecular weight of less than 200 000 is generally from 40 to 80% by weight, preferably from 45 to 75% by weight.

The expandable styrene polymers contain, as blowing agent b), from 1 to 10% by weight, preferably from 2 to 6% by weight, in particular from 2.5 to 4% by weight, based on component a), of a $C_3$- to $C_6$-hydrocarbon, such as propane, butane, isobutane, n-pentane, i-pentane, neopentane, cyclopentane and/or hexane. A commercially available pentane mixture is preferably used.

Component c) in the expandable styrene polymers may be conventional assistants, such as dyes, pigments, fillers, stabilizers, flameproofing agents, synergists, nucleating agents, lubricants and the like, in conventional effective amounts.

Other suitable additives are poly(2,6-dimethyl)-1,4-phenylene ether and poly-1,4-phenylene sulfide (cf. DE-A-39 04 370 and DE-A-39 24 868). These additives increase the heat resistance of the foam. Other suitable additives are styrene-soluble elastomers (cf. DE-A-39 15 602), which increase the resilience of the foam.

In a preferred process, the expandable styrene polymers according to the invention are prepared by polymerizing styrene, if desired in the presence of comonomers, in aqueous suspension, with the abovedescribed blowing agent and, if desired, the additives being added before, during or after the polymerization. It is essential to the invention that both a regulator and a branching agent are used in the polymerization.

It is usual to use from 0.01 to 1% by weight, preferably from 0.1 to 0.75% by weight, in particular from 0.25 to 0.5% by weight, of a regulator having a chain-transfer constant K of from 0.1 to 50, preferably from 1 to 30, as described in EP-B 106 129 and DE-A 39 21 148. Examples of suitable regulators are thiols, such as n-dodecyl mercaptan (K=19), tert-dodecyl mercaptan (K=3), n-butyl mercaptan (K=22) and tert-butyl mercaptan (K=3.6), and furthermore pentaphenylethane (K=2.0) and dimeric α-methylstyrene (K=0.5).

Suitable branching agents, which are generally used in amounts from 0.0025 to 0.05 mol-%, preferably from 0.005 to 0.025 mol-%, are monomers containing more than one, preferably two, polymerizable double bonds, such as butadiene, isoprene, vinylcyclohexene, vinyl acrylate, divinylbenzene, glycol di(meth)acrylate, butanediol diacrylate, butanediol dimethacrylate and hexanediol diacrylate. The regulator and branching agent are either introduced before commencing the polymerization or not added to the batch until during the polymerization, for example at a conversion of from 20 to 80%. The regulator is advantageously introduced before and the branching agent during the polymerization.

The polymerization catalyst used is an initiator conventional in the free-radical polymerization of styrene, in particular an organic peroxy compound, such as a perester, percarbonate, peroxide, peroxycarbonate, perketal, inter alia. A combination of peroxy compounds which decompose at low temperature, such as dibenzoyl peroxide or t-butyl peroxy-2-ethylhexylhexanoate, with those which decompose at elevated temperature, such as tert-butyl perbenzoate and dicumyl peroxide, has proven successful.

Simultaneous use of regulator and branching agent gives a branched styrene polymer of conventional molecular weight which is distinguished by a particularly high expansion capacity.

The styrene content in the expandable styrene polymers should generally be low and is usually less than 0.2% by weight, preferably less than 0.1% by weight, in particular less than 0.08% by weight. In order to achieve this objective, it is expedient, if mercaptans are used as the regulator, not to add them until during the polymerization, at a conversion of from 20 to 90%.

The blowing agent-containing polystyrene particles according to the invention are bead-shaped and generally have a diameter of from 0.2 to 4 mm. They can be prefoamed by conventional methods, for example using steam, to give foam particles having a diameter of from 0.5 to 2 cm and a density of from 0.005 to 0.1 g/cm$^3$. It has been found that the throughput in commercially available continuous prefoamers is considerably increased or the same throughput is achieved using a smaller amount of blowing agent.

The prefoamed particles can then be fully foamed by conventional methods to give foam moldings having a density of from 0.005 to 0.1 g/cm$^3$.

In the examples, parts are by weight.

EXAMPLES 1 to 9

1. Polymerization

A mixture of 150 parts of water, 0.1 part of sodium pyrophosphate, 100 parts of styrene, 0.15 part of benzoyl peroxide, 0.25 part of tert-butyl perbenzoate and the amounts of pentane indicated in the table was heated to 90° C. over the course of 2 hours with stirring in a pressure-tight stirred reactor. The amounts of regulator and branching agent indicated in the table were also added. The time of addition is measured from commencement of the polymerization.

After 1 hour at 90° C., 4 parts of a 10% strength aqueous solution of polyvinylpyrrolidone were added. The amounts of pentane given in the table were added after the times also given in the table.

The mixture was then stirred for a further 2 hours at 90° C., subsequently for 2 hours at 100° C. and finally for 4 hours at 125° C.

The bead polymer obtained, having a mean particle diameter of 1.2 mm, was isolated, washed and dried.

The viscosity (0.5% strength in toluene at 25° C.) was determined in accordance with DIN 53 726, and the melt flow index MFI (180° C., 3.8 kp) in accordance with DIN 53 735, in each case on degassed samples.

2. Expandability

The expandability was determined using a screen (mesh width 0.1 to 0.2 mm, dimensions 1000×800×250 mm) enclosed by a metal frame and located in a sealed metal housing with steam inlet and extractor.

The steam at 100° C. flowed into the prefoaming apparatus from the bottom, passed through the wire mesh holding the products to be tested and escaped through the steam extractor. Before the tests were commenced, the apparatus was first preheated for about 5 minutes. 100 g of the expanded bead polymers having a particle diameter of from 1.0 to 2.0 mm were subsequently distributed uniformly on the mesh, the apparatus was closed, and the steam valve was opened. After a certain time, the steam valve was closed again and the metal housing was opened. The bulk density was subsequently determined on the prefoamed material. The table shows the minimum achievable bulk density and the prefoaming time necessary for this.

The results obtained are shown in the table.

3. Molecular weight and degree of branching

The mean molecular weight $M_w$ and the degree of branching of the styrene polymers were determined on degassed samples, the former by the GPC method and the latter by gel permeation chromatography coupled on-line to a laser scattered light instrument, by the method of R. C. Jordan, M. L. Connell, ACS Symposium Series No. 138 (1980), p. 107–129, Size Exclusion Chromatography (GPC), Theodore Provder, Editor. Conversion into the ratio between the mean square radii of inertia of the branched and linear samples, which is required to characterize the degrees of branching, was carried out by the method of M. Hoffmann, H. Krömer, R. Kuhn: Polymeranalytik I, Georg Thieme Verlag, Stuttgart, 1977. The degree of branching was determined by the method of B. H. Zimm, W. H. Stockmayer, J. Chem. Phys. 17 (1949) 1301 for the number of branching points n<5 and a functionality f of 4.

TABLE

| | Example | | | | | | | | |
|---|---|---|---|---|---|---|---|---|---|
| | 1 (comparison) | 2 (comparison) | 3 | 4 | 5 | 6 | 7 | 8 | 9 |
| Pentane [parts] | 4 | 4 | 4 | 4 | 4 | 4.2 | 3 | 4.6 | 4.6 |
| Pentane [time of addition, h] | 4.5 | 5 | 5 | 5 | 5 | 5 | 5 | 5 | 5 |
| Regulator | — | DMS | DMS | DMS | DMS | DMS | DMS | t-DM | t-DM |
| Amount of regulator [parts] | 0 | 0.25 | 0.35 | 0.35 | 0.5 | 0.35 | 0.35 | 0.4 | 0.4 |
| Time of addition [h] | — | beginning | beginning | beginning | beginning | beginning | beginning | 4.5 | 4.5 |
| Branching agent | — | — | BDDA | BDDA | BDDA | BDDA | BDDA | HDDA | BDDA |
| Amount of branching agent [mol-%] | 0 | 0 | 0.013 | 0.025 | 0.025 | 0.005 | 0.013 | 0.01 | 0.005 |
| Time of addition [h] | — | — | 5 | 5 | 5 | 5 | 5 | 5 | 5 |
| Viscosity [ml/g] | 75.3 | 64.2 | 58.9 | 65.3 | 56.9 | 59.9 | 62.5 | 65.0 | 59.2 |
| MFI [ml/10 min] | 7.7 | 9.3 | 16.8 | 21.7 | 26.6 | 16.0 | 16.7 | 15.9 | 15.4 |
| Mean molecular weight $M_w$ | 214000 | 170000 | 178000 | 249000 | 201000 | 180000 | 187000 | 190000 | 186000 |
| Degree of branching [branches per 1000 monomer units] | 0 | 0 | 0.24 | 0.43 | 0.38 | 0.08 | 0.20 | 0.19 | 0.08 |
| Proportion having $M_w$ <200 000 [%] | 59 | 69 | 71 | 65 | 74 | 69 | 67 | 63 | 71 |
| Bulk density [g/cm$^3$] | 0.0172 | 0.0147 | 0.0119 | 0.0108 | 0.0098 | 0.0117 | 0.0180 | 0.0121 | 0.0122 |
| Prefoaming time [min] | 10 | 10 | 12 | 10 | 12 | 8 | 12 | 10 | 8 |

BDDA = butanediol diacrylate
DMS = dimeric α-methylstyrene
HDDA = hexanediol diacrylate
t-DM = t-dodecyl mercaptan

We claim:

1. A process for the preparation of an expandable styrene polymer having a viscosity, measured in toluene, of from 55 to 80 [ml/g] and a melt flow index (MFI) (190° C., 3.8 KP) of 7.5 to 30 [g/10 min] which comprises polymerizing styrene and, in aqueous suspension in the presence of from 0.01 to 1% by weight of a regulator having a chain-transfer constant K of from 0.1 to 50 and in the presence of from 0.0025 to 0.05 mol-% of a monomer containing more than one polymerizable double bond as branching agent, and adding the blowing agent before, during or after polymerization.

2. The process of claim 1, wherein further comonomers containing a polymerizable double bond are copolymerized with styrene.

* * * * *